United States Patent [19]
Mead, Jr. et al.

[11] Patent Number: 5,590,031
[45] Date of Patent: Dec. 31, 1996

[54] SYSTEM FOR CONVERTING ELECTROMAGNETIC RADIATION ENERGY TO ELECTRICAL ENERGY

[76] Inventors: Franklin B. Mead, Jr., 44536 Avenida Del Sol, Lancaster, Calif. 93535; Jack Nachamkin, 12314 Teri Dr., Poway, Calif. 92064

[21] Appl. No.: 281,271

[22] Filed: Jul. 27, 1994

[51] Int. Cl.$^6$ .................................................... H02M 1/00
[52] U.S. Cl. .............................. 363/8; 363/178; 342/6
[58] Field of Search ................................ 363/8, 13, 178; 342/6, 61, 73, 173, 175

[56] References Cited

U.S. PATENT DOCUMENTS

| | | | |
|---|---|---|---|
| 3,882,503 | 5/1975 | Gamara | 343/100 R |
| 4,725,847 | 2/1988 | Poirier | 343/840 |
| 5,008,677 | 4/1991 | Trigon et al. | 342/17 |

Primary Examiner—Peter S. Wong
Assistant Examiner—Adolf Berhane
Attorney, Agent, or Firm—Chris Papageorge

[57] ABSTRACT

A system is disclosed for converting high frequency zero point electromagnetic radiation energy to electrical energy. The system includes a pair of dielectric structures which are positioned proximal to each other and which receive incident zero point electromagnetic radiation. The volumetric sizes of the structures are selected so that they resonate at a frequency of the incident radiation. The volumetric sizes of the structures are also slightly different so that the secondary radiation emitted therefrom at resonance interfere with each other producing a beat frequency radiation which is at a much lower frequency than that of the incident radiation and which is amenable to conversion to electrical energy. An antenna receives the beat frequency radiation. The beat frequency radiation from the antenna is transmitted to a converter via a conductor or waveguide and converted to electrical energy having a desired voltage and waveform.

14 Claims, 8 Drawing Sheets

SYSTEM FOR CONVERTING ELECTROMAGNETIC RADIATION ENERGY TO ELECTRICAL ENERGY

BACKGROUND OF THE INVENTION

The invention relates generally to conversion of electromagnetic radiation energy to electrical energy, and, more particularly, to conversion of high frequency bandwidths of the spectrum of a type of radiation known as zero point electromagnetic radiation to electrical energy.

The existence of zero point electromagnetic radiation was discovered in 1958 by the Dutch physicist M. J. Sparnaay. Mr. Sparnaay continued the experiments carried out by Hendrik B. G. Casimir in 1948 which showed the existence of a force between two uncharged parallel plates which arose from electromagnetic radiation surrounding the plates in a vacuum. Mr. Sparnaay discovered that the forces acting on the plates arose from not only thermal radiation but also from another type of radiation now known as classical electromagnetic zero point radiation. Mr. Sparnaay determined that not only did the zero point electromagnetic radiation exist in a vacuum but also that it persisted even at a temperature of absolute zero. Because it exists in a vacuum, zero point radiation is homogeneous and isotropic as well as ubiquitous. In addition, since zero point radiation is also invariant with respect to Lorentz transformation, the zero point radiation spectrum has the characteristic that the intensity of the radiation at any frequency is proportional to the cube of that frequency. Consequently, the intensity of the radiation increases without limit as the frequency increases resulting in an infinite energy density for the radiation spectrum. With the introduction of the zero point radiation into the classical electron theory, a vacuum at a temperature of absolute zero is no longer considered empty of all electromagnetic fields. Instead, the vacuum is now considered as filled with randomly fluctuating fields having the zero point radiation spectrum. The special characteristics of the zero point radiation which are that it has a virtually infinite energy density and that it is ubiquitous (even present in outer space) make it very desirable as an energy source. However, because high energy densities exist at very high radiation frequencies and because conventional methods are only able to convert or extract energy effectively or efficiently only at lower frequencies at which zero point radiation has relatively low energy densities, effectively tapping this energy source has been believed to be unavailable using conventional techniques for converting electromagnetic energy to electrical or other forms of easily useable energy. Consequently, zero point electromagnetic radiation energy which may potentially be used to power interplanetary craft as well as provide for society's other needs has remained unharnessed.

There are many types of prior art systems which use a plurality of antennas to receive electromagnetic radiation and provide an electrical output therefrom. An example of such a prior art system is disclosed in U.S. Pat. No. 3,882,503 to Gamara. The Gamara system has two antenna structures which work in tandem and which oscillate by means of a motor operatively attached thereto in order to modulate the radiation reflected from the antenna surfaces. The reflecting surfaces of the antennas are also separated by a distance equal to a quarter wavelength of the incident radiation. However, the Gamara system does not convert the incident radiation to electrical current for the purpose of converting the incident electromagnetic radiation to another form of readily useable energy. In addition, the relatively large size of the Gamara system components make it unable to resonate at and modulate very high frequency radiation.

What is therefore needed is a system which is capable of converting high frequency electromagnetic radiation energy into another form of energy which can be more readily used to provide power for transportation, heating, cooling as well as various other needs of society. What is also needed is such a system which may be used to provide energy from any location on earth or in space.

SUMMARY OF THE INVENTION

It is a principle object of the present invention to provide a system for converting electromagnetic radiation energy to electrical energy.

It is another object of the present invention to provide a system for converting electromagnetic radiation energy having a high frequency to electrical energy.

It is another object of the present invention to provide a system for converting zero point electromagnetic radiation energy to electrical energy.

It is another object of the present invention to provide a system for converting electromagnetic radiation energy to electrical energy which may used to provide such energy from any desired location on earth or in space.

It is another object of the present invention to provide a system for converting electromagnetic radiation energy to electrical energy having a desired waveform and voltage.

It is an object of the present invention to provide a miniaturized system for converting electromagnetic radiation energy to electrical energy in order to enhance effective utilization of high energy densities of the electromagnetic radiation.

It is an object of the present invention to provide a system for converting electromagnetic radiation energy to electrical energy which is simple in construction for cost effectiveness and reliability of operation.

Essentially, the system of the present invention utilizes a pair of structures for receiving incident electromagnetic radiation which may be propagating through a vacuum or any other medium in which the receiving structures may be suitably located. The system of the present invention is specifically designed to convert the energy of zero point electromagnetic radiation; however, it may also be used to convert the energy of other types of electromagnetic radiation. The receiving structures are preferably composed of dielectric material in order to diffract and scatter the incident electromagnetic radiation. In addition, the receiving structures are of a volumetric size selected to enable the structures to resonate at a high frequency of the incident electromagnetic radiation based on the parameters of frequency of the incident radiation and propagation characteristics of the medium and of the receiving structures. Since zero point radiation has the characteristic that its energy density increases as its frequency increases, greater amounts of electromagnetic energy are available at higher frequencies. Consequently, the size of the structures are preferably miniaturized in order to produce greater amounts of energy from a system located within a space or area of a given size. In this regard, the smaller the size of the receiving structures, the greater the amount of energy that can be produced by the system of the present invention.

At resonance, electromagnetically induced material deformations of the receiving structures produce secondary fields of electromagnetic energy therefrom which may have evanescent energy densities several times that of the incident radiation. The structures are of different sizes so that the secondary fields arising therefrom are of different frequencies. The difference in volumetric size is very small so that interference between the two emitted radiation fields, and the receiving structures at the two different frequencies produces a beat frequency radiation which has a much lower frequency than the incident radiation. The beat frequency radiation preferably is at a frequency which is sufficiently low that it may be relatively easily converted to useable electrical energy. In contrast, the incident zero point radiation has its desirable high energy densities at frequencies which are so high that conventional systems for converting the radiation to electrical energy either cannot effectively or efficiently so convert the radiation energy or simply cannot be used to convert the radiation energy for other reasons.

The system of the present invention also includes an antenna which receives the beat frequency radiation. The antenna may be a conventional metallic antenna such as a loop or dipole type of antenna or a rf cavity structure which partially encloses the receiving structures. The antenna feeds the radiation energy to an electrical conductor (in the case of a conventional dipole or comparable type of antenna) or to a waveguide (in the case of a rf cavity structure). The conductor or waveguide feeds the electrical current (in the case of the electrical conductor) or the electromagnetic radiation (in the case of the waveguide) to a converter which converts the received energy to useful electrical energy. The converter preferably includes a tuning circuit or comparable device so that it can effectively receive the beat frequency radiation. The converter may include a transformer to convert the energy to electrical current having a desired voltage. In addition, the converter may also include a rectifier to convert the energy to electrical current having a desired waveform.

DETAILED DESCRIPTION OF THE PREFERRED EMBODIMENT

Figure 1:
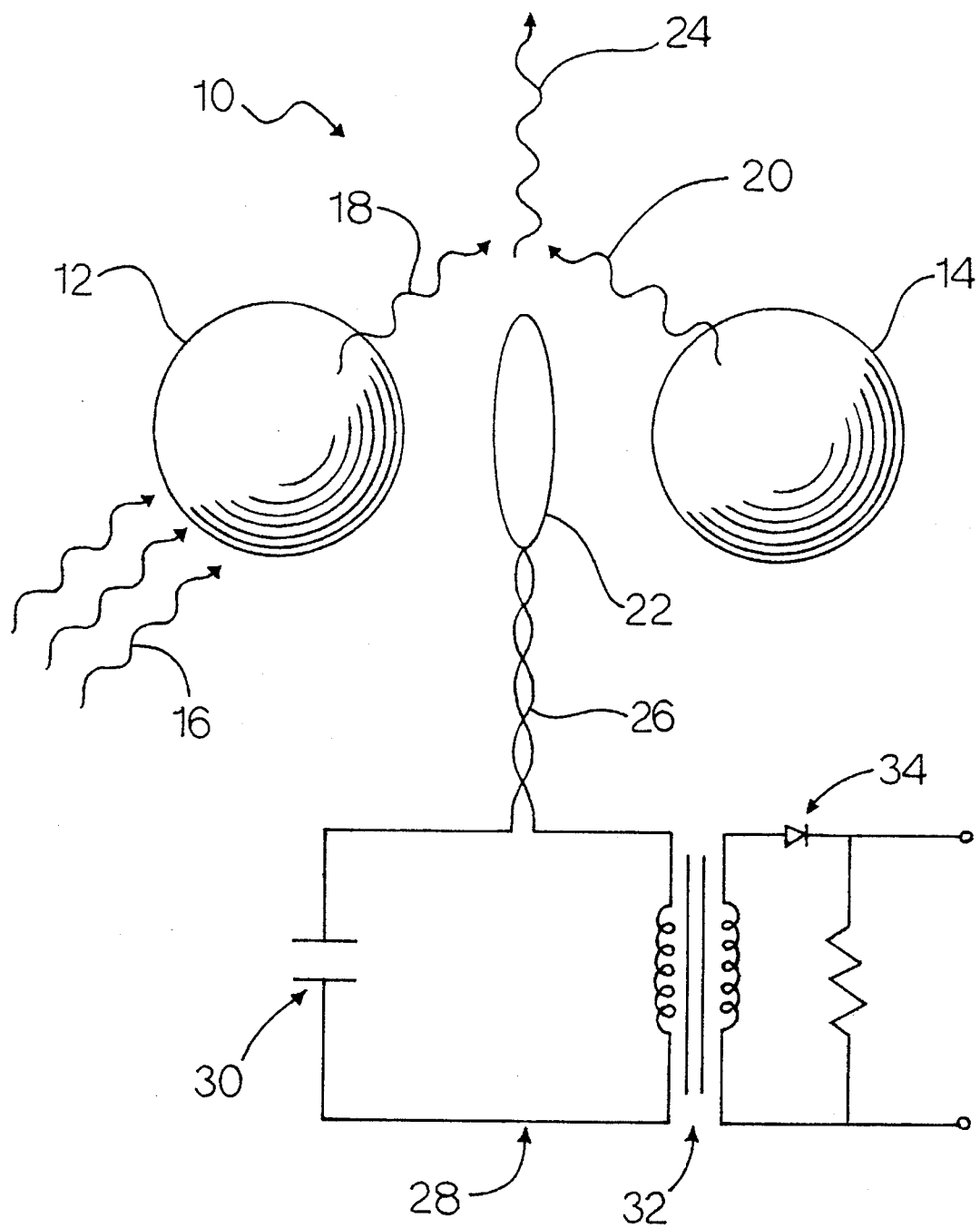
FIG. 1 is a plan view of the receiving structures and antenna of a first embodiment of the system of the present invention with a schematic view of the conductor and converter thereof and also showing the incident primary and emitted secondary electromagnetic radiation.

Referring to the drawings, a first embodiment of the present invention is generally designated by the numeral 10. The system 10 includes a first and second means for receiving 12 and 14 incident electromagnetic radiation 16. The means for receiving 12 and 14 are preferably a pair of spherical structures 12 and 14 which are preferably composed of a dielectric material. Alternatively, the spheres 12 and 14 may be cubical structures or any other suitable shape. The spheres 12 and 14 may be mounted on a suitable foundation by any suitable mounting means (not shown), or spheres 12 and 14 may be suspended from a suitable foundation by any suitable suspension means (not shown). The spheres 12 and 14 are preferably composed of a dielectric material. The dielectric spheres 12 and 14 scatter and concentrate electromagnetic waves. At very sharpely defined frequencies, the spheres 12 and 14 will have resonances wherein the internal energy densities can be five orders of mangitude larger than the energy density of the incident electromagnetic field driving the spheres 12 and 14. At resonance, the electromagnetic stresses, equivalent to pressures proportional to the energy density, can cause material deformation of the spheres 12 and 14 which produce a secondary electromagnetic field. The spheres 12 and 14 are preferably positioned proximal to each other, as shown in FIG. 1. Although the proximity of the spheres to each other will adversely affect the resonances, the very high "Q"s of the isolated-sphere resonances results in such adverse affect being relatively small. However, the proximity of the spheres 12 and 14 allows the spheres to interact electromechanically which increases the magnitude of the secondary radiation emitted therefrom.

The electromagnetic radiation incident upon the spheres 12 and 14 which drives the spheres to resonance is preferably zero point radiation 16. However, other types of electromagnetic radiation may also be used to drive the spheres 12 and 14, if desired.

Figure 6:
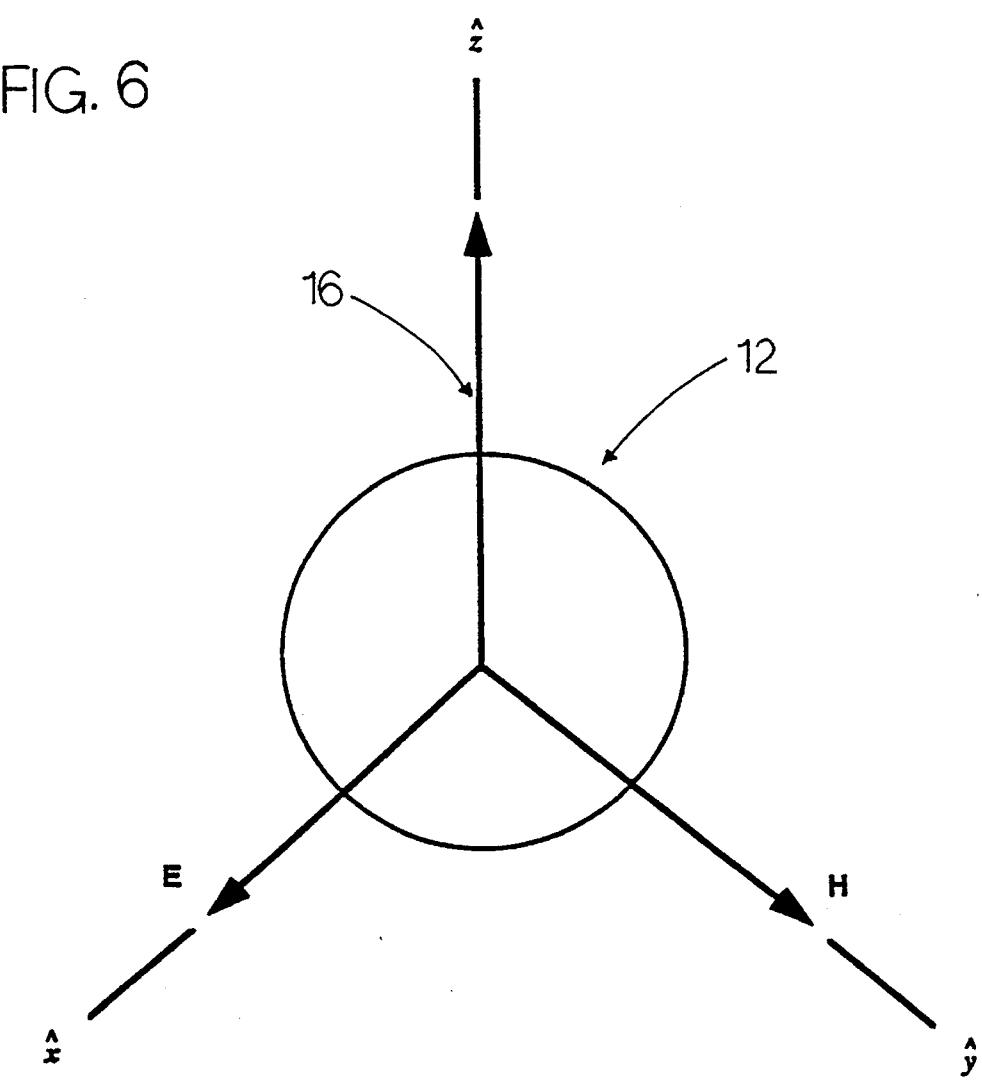
FIG. 6 is a diagram of a receiving structure of the system of the present invention showing an incident electromagnetic plane wave impinging on the receiving structure and illustrating the directions of the electric and magnetic field vectors thereof.

The effect of a dielectric sphere such as 12 or 14 on an incident electromagnetic radiation such as a plane wave thereof is shown in FIG. 6. The plane wave propagates in the z axis direction and is diffracted by the sphere 12 resulting in scattering thereof. This scattering is commonly known as Mie scattering. The incident radiation wave has an electric vector component which is linearly polarized in the x axis direction and a magnetic vector component which is linearly polarized in the y axis direction.

An electromagnetic wave incident upon a structure produces a forced oscillation of free and bound charges in synch with the primary electromagnetic field of the incident electromagnetic wave. The movements of the charges produce a secondary electromagnetic field both inside and outside the structure. The secondary electromagnetic radiation comprising this secondary electromagnetic field is shown in FIG. 1 and designated by the numerals 18 and 20. An antenna which is shown simply as a loop antenna but may also be a dipole or any other suitable type of antenna is also shown in FIG. 1 and designated by the numeral 22. The nonlinear mutual interactions of the spheres produces interference between the secondary electromagnetic radiation 18 and 20 produces a beat frequency radiation 24 which is preferably at a much lower frequency than the primary radiation 16. It is this beat frequency radiation 24 which is desired for conversion into electrical energy because it preferably is within the frequency range of rf radiation which may be converted into electrical energy by generally conventional systems. Thus, the radiation 24 received by the antenna 22 is fed via an electrical conductor 26 to a means for converting the beat frequency radiation 24 to electrical energy. This means for converting is designated by the numeral 28 and preferably includes a tuning capacitor 30 and a transformer 32 and a rectifier (preferably a diode) 34. Instead of including the capacitor 30, transformer 32 and rectifier 34, the converter 28 may alternatively include an rf receiver of any suitable type.

Figure 7:
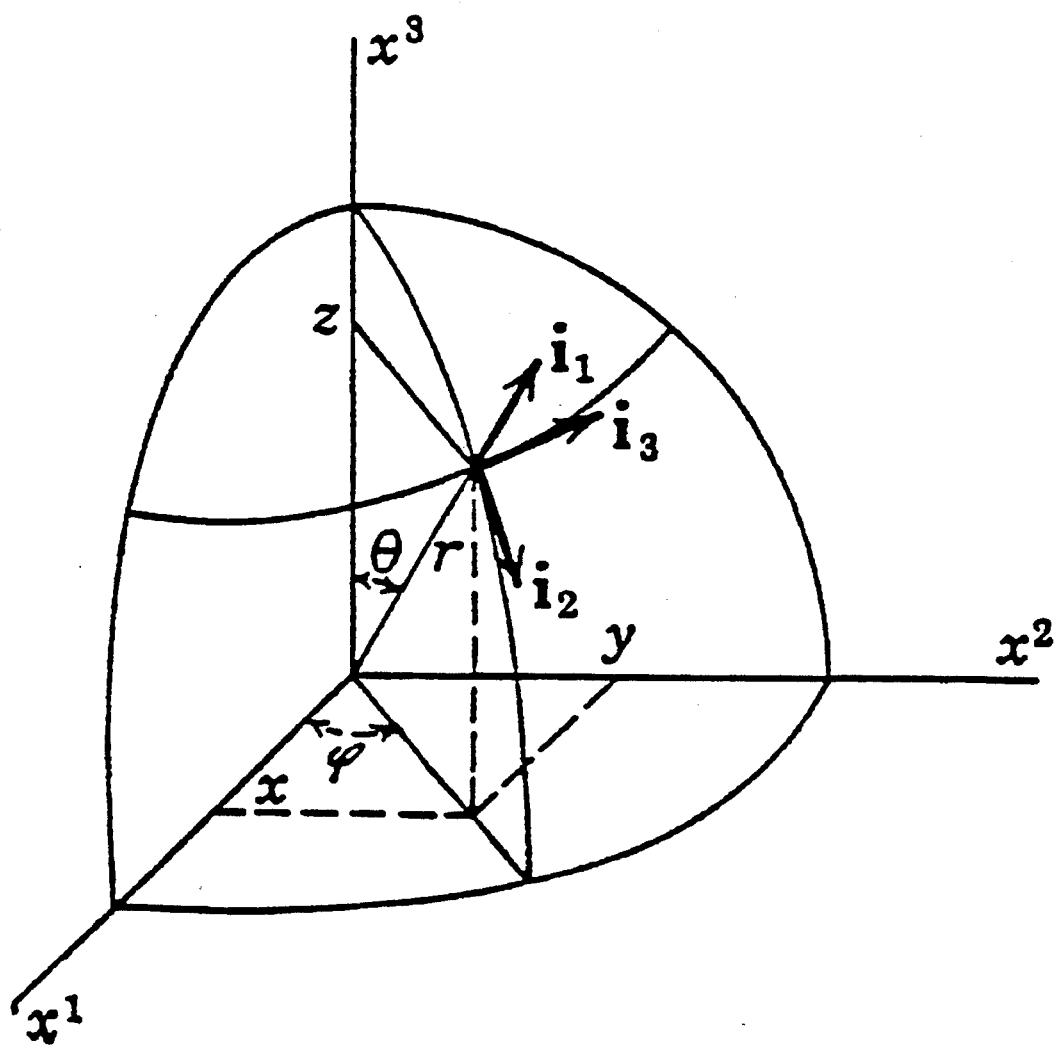
FIG. 7 is a diagram of a spherical coordinate system as used in the formulas utilized in the system of the present invention.

The resultant field at any point is the vector sum of the primary and secondary fields. For the equations that follow, the structure receiving the incident plane wave is a sphere of radius a having a propagation constant $k_1$ positioned in an infinite, homogeneous medium having a propagation constant $k_2$. The incident plane wave propagates in the z axis direction and is as shown in FIG. 6. The spherical coordinate system used for the vector spherical wave functions is shown in FIG. 7. Expansion of the incident field provides:

$$E_i = E_0 e^{-i\omega t} \sum_{n=1}^{\infty} i^n \frac{2n+1}{n(n+1)} (m_{0\ln}^{(1)} - i n_{e\ln}^{(1)})$$

$$H_i = -\frac{k_2}{\omega\mu_2} E_0 e^{-i\omega t} \sum_{n=1}^{\infty} i^n \frac{2n+1}{n(n+1)} (m_{e\ln}^{(1)} + i n_{0\ln}^{(1)})$$

where E is the electric field and H is the magnetic field; and $$m_{\substack{0\ln \\ e\ln}}^{(1)} = \pm \frac{1}{\sin\theta} j_n(k_2 R) P_n^1(\cos\theta) \substack{\cos \\ \sin} \phi i_2 - j_n(k_2 R) \frac{\partial P_n^1}{\partial \theta} \substack{\sin \\ \cos} \phi i_3$$

$$n_{\substack{0\ln \\ e\ln}}^{(1)} = \frac{n(n+1)}{k_2 R} j_n(k_2 R) P_n^1(\cos\theta) \substack{\sin \\ \cos} \phi i_1 + \frac{1}{k_2 R} [k_2 R j_n(k_2 R)]' \times$$

$$\frac{\partial P_n^1}{\partial \theta} \substack{\sin \\ \cos} \phi i_2 \pm \frac{1}{k_2 R \sin\theta} [k_2 R j_n(k_2 R)]' P_n^1(\cos\theta) \substack{\cos \\ \sin} \phi i_3.$$

The electric and magnetic fields of the incident wave transmitted into the sphere i.e., R<a, can be similarly expanded:

$$E_t = E_0 e^{-i\omega t} \sum_{n=1}^{\infty} i^n \frac{2n+1}{n(n+1)} \left( a_n^{tm} \substack{(1) \\ 0\ln} - i b_n^{tn} \substack{(1) \\ e\ln} \right)$$

$$H_t = \frac{k_2}{\phi\mu_1} E_0 e^{-i\omega t} \sum_{n=1}^{\infty} i^m \frac{2n+1}{n(n+1)} \left( b_n^{tm} \substack{(1) \\ e\ln} - i a_n^{tn} \substack{(1) \\ 0\ln} \right)$$

If $j_n(k_2 R)$ is replaced by $h_n^{(1)}(k_2 R)$ in the previous equations, the functions $m^{(1)}$ and $n^{(1)}$ become $m^{(3)}$ and $n^{(3)}$. The outgoing fields i.e., R>a, are represented by:

$$E_R = E_0 e^{-i\omega t} \sum_{n=1}^{\infty} i^n \frac{2n+1}{n(n+1)} \left( a_n^{rm} \substack{(3) \\ 0\ln} - i b_n^{rn} \substack{(3) \\ e\ln} \right)$$

$$H_r = \frac{k_2}{\phi\mu_1} E_0 e^{-i\omega t} \sum_{n=1}^{\infty} i^m \frac{2n+1}{n(n+1)} \left( b_n^{rm} \substack{(3) \\ e\ln} - i a_n^{rn} \substack{(3) \\ 0\ln} \right)$$

where $H_r$ represents the resultant wave in the medium surrounding the sphere. At resonance, the values of $\rho$ at resonance require that the $a_n^t$ and $b_n^t$ coefficients be infinite. In order to determine these values of $a_n^t$ and $b_n^t$, the boundary conditions at the sphere radius are needed. Since there must be continuity of the E and H values at the surface, the following equations are used:

$i_1 \times (E_i + E_r) = i_1 \times E_t$ and $i_1 \times (H_i + H_r) = i_1 \times H_t$ which lead to two pairs of inhomogeneous equations:

$a_n^t j_n(N\rho) - a_n^r h_n^{(1)}(\rho) = j_n(\rho)$ $\mu_2 a_n^t [N\rho j_n(N\rho)]' - \mu_1 a_n^r [\rho h_n^{(1)}(\rho)]' = \mu_1 [\rho j_n(\rho)]'$ and $\mu_2 N b_n^t j_n(N\rho) - \mu_1 b_n^r h_n^{(1)}(\rho) = \mu_1 j_n(\rho)$ $b_n^t [N\rho j_n(N\rho)]' - N b_n^r [\rho h_n^{(1)}(\rho)]' = N[\rho j_n(\rho)]'$ where $k_1 = Nk_2$, $\rho = k_2 a$, $k_1 a = N\rho$. Spherical Bessel functions of the first kind are denoted by $j_n$, while those of the third kind are denoted by $h_n^{(1)}$. The resulting equations are:

$$a_n^t = \frac{\mu_1 j_n(\rho)[\rho h_n^{(1)}(\rho)]' - \mu_1 h_n^{(1)}(\rho)[\rho j_n(\rho)]'}{\mu_1 j_n(N\rho)[\rho h_n^{(1)}(\rho)]' - \mu_2 h_n^{(1)}(\rho)[N\rho j_n(N\rho)]'}$$

and $$b_n^t = \frac{\mu_1 N j_n(\rho)[\rho h_n^{(1)}(\rho)]' - \mu_1 N h_n^{(1)}(\rho)[\rho j_n(\rho)]'}{\mu_2 N^2 j_n(N\rho)[\rho h_n^{(1)}(\rho)]' - \mu_1 h_n^{(1)}(\rho)[N\rho j_n(N\rho)]'}$$

At a resonance, the denominator of either $a_n^t$ or $b_n^t$ will be zero. Thus, $\rho$ values are found using the above equations that correspond to a resonant combination of angular frequency ($\omega$) and radius (a) for a given sphere material and given surrounding medium. In determining such values of $\rho$, the following equations are also specifically used:

$$\rho = ak_2 = a\omega\sqrt{\epsilon_2 \mu_2} \text{ and}$$

$$\rho_1 = (k_1/k_2)\rho$$

where $\rho_1$ corresponds to the sphere material. An iterative method is preferably used to find the desired values of $\rho$ at resonance. In calculating $\rho$ utilizing the above equations for purposes of example, it was assumed that $\mu_1 = \mu_2 = \mu_0 = 4\pi \times 10^{-7}$ and $\epsilon_2 = \epsilon_0 = 8.85419 \times 10^{-12}$.

One major root of $\rho$ which was found has a value of:

Real ($\rho$)=+66.39752607619131

Imaginary ($\rho$)=−0.6347867071968998.

Figure 8:
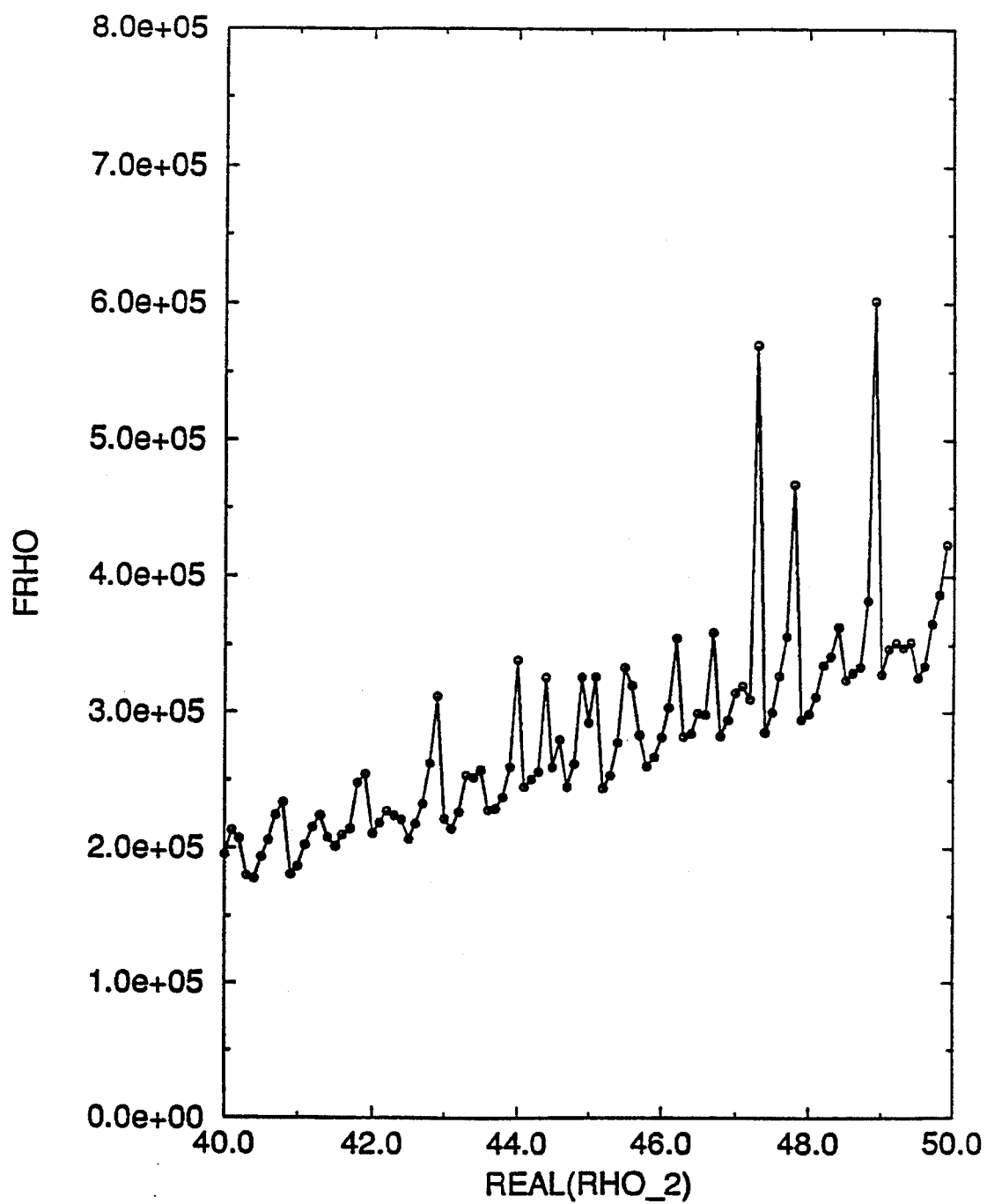
FIG. 8 is a graph showing an imaginary $\rho$ parameter plotted against a real $\rho$ parameter illustrating the values thereof at resonance as well as values thereof at other than resonance.
Figure 9:
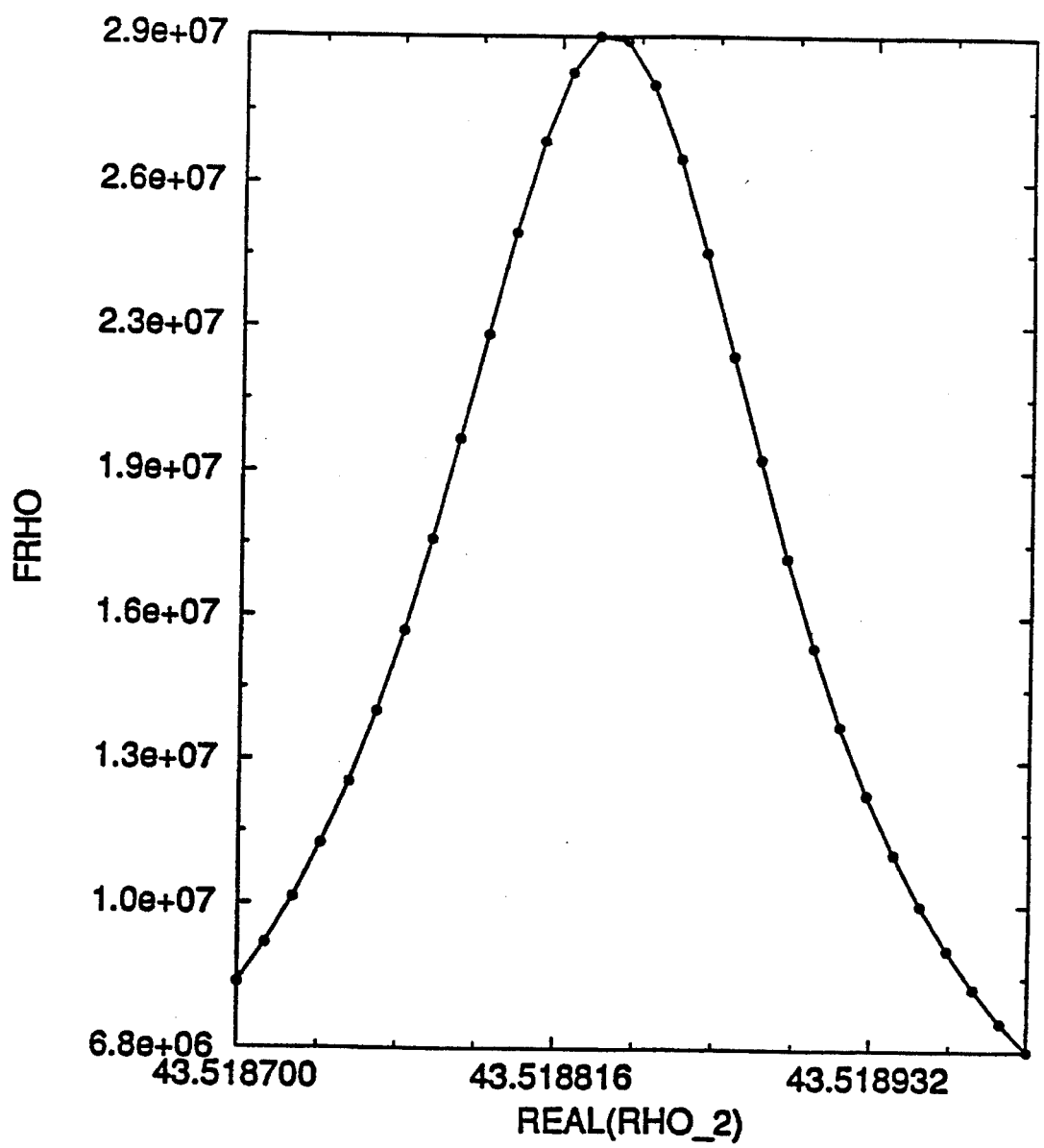
FIG. 9 is a graph showing a portion of the graphical representation shown in FIG. 8 illustrating the real and imaginary $\rho$ values at or near a single resonance.

These particular values are not shown in FIG. 8. However, other values of $\rho$ found using the equations set forth herein are shown in FIG. 8. The peaks in FIG. 8 are the resonances. One of these resonances shown in FIG. 8 is shown in detail in FIG. 9. These resonance values are shown for purposes of example. Other resonances also exist which have not been determined; thus, not all possible resonance values are shown in FIGS. 8 and 9.

Calculation of these values also allows the determination of a possible am combination which would have these root values. For ρ, ε (epsilon)=$\epsilon_0$ and µ=$\mu_0$, and $$\rho = a\omega \sqrt{\epsilon_0 \mu_0} = a\omega/c.$$

Expressed in SI units, the speed of light c=$2.99792458 \times 10^{14}$ m/s. If an a value of $10^{-6}$ m is assumed for the examples shown herein, then:

$$\omega = \rho c/a \approx 1.9919 \times 10^{16} - i1.9044 \times 10^{14} \text{ radians/s}.$$

This is an example of the angular frequency required within the impingent EM radiation in order to create a resonant situation. Examples of other resonances were indicated, and these are shown in FIG. 8. No complex-frequency plane waves exist. Therefore, the calculations were made by considering only the real portion of the above root and setting the imaginary portion equal to zero. However, upon doing this, the iterative calculation procedure becomes insensitive to any root in the vicinity of the root's real portion. In the iterative calculation procedure, initially a range of ρ values is input into the equations. These ρ values are in the neighborhood of the prospective root. A range of ρ values is subsequently studied to find any imaginary ρ i.e., fρ (a function of ρ), peaks in that range. Next, once a peak has been chosen, the function order n giving the dominant fρ is determined. This also gives a clue as to whether the peak is due to a magnetic resonance ($a_n$ approaches infinity) or an electrical resonance ($b_n$ approaches infinity). A large number of Newton-Raphson iterations is preferably performed in order to converge upon a root ρ value.

Figure 2:
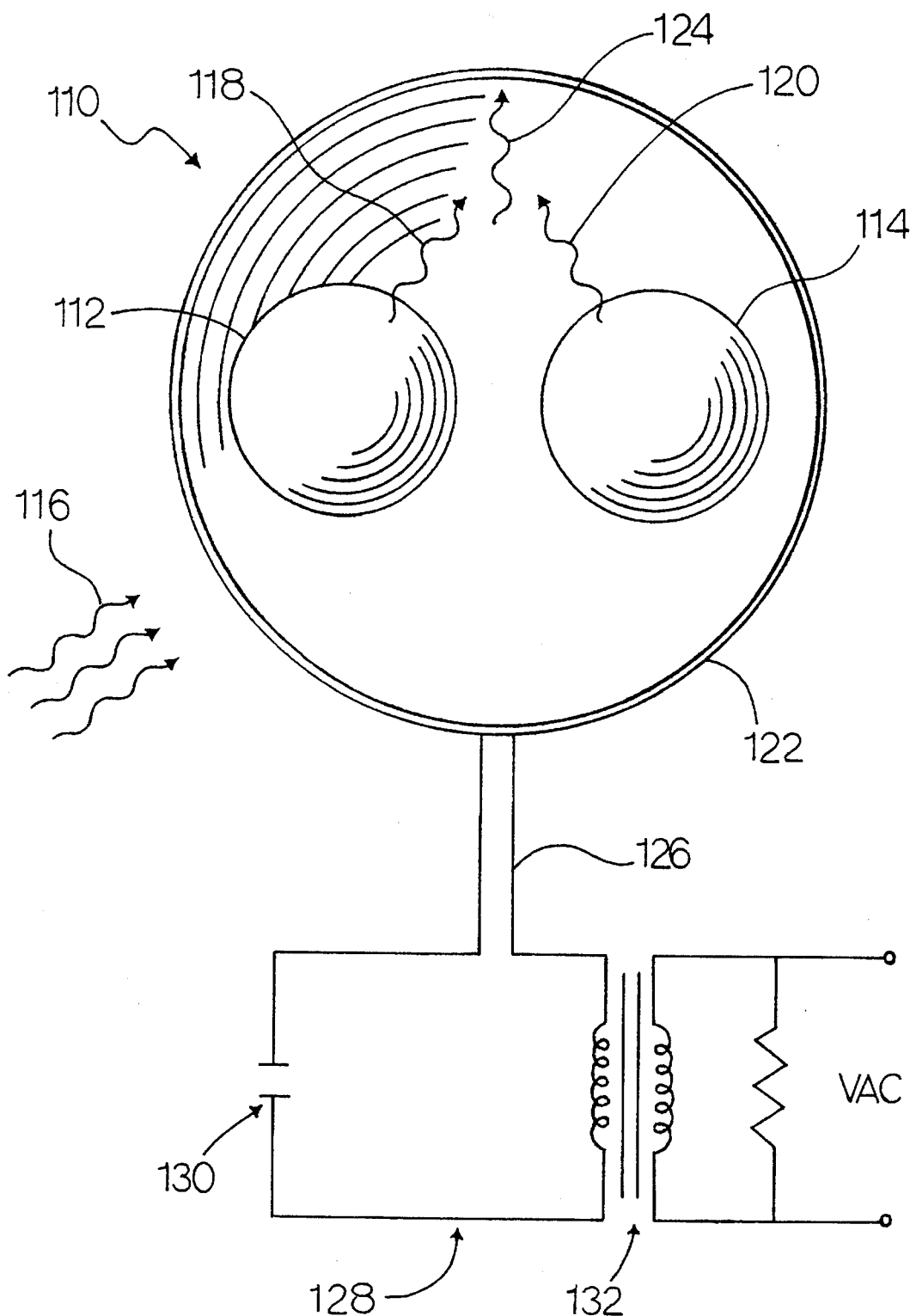
FIG. 2 is a front view of the receiving structures, antenna and waveguide of a second embodiment of the system of the present invention with a schematic view of the converter thereof and also showing the incident primary and emitted secondary electromagnetic radiation.
Figure 3:
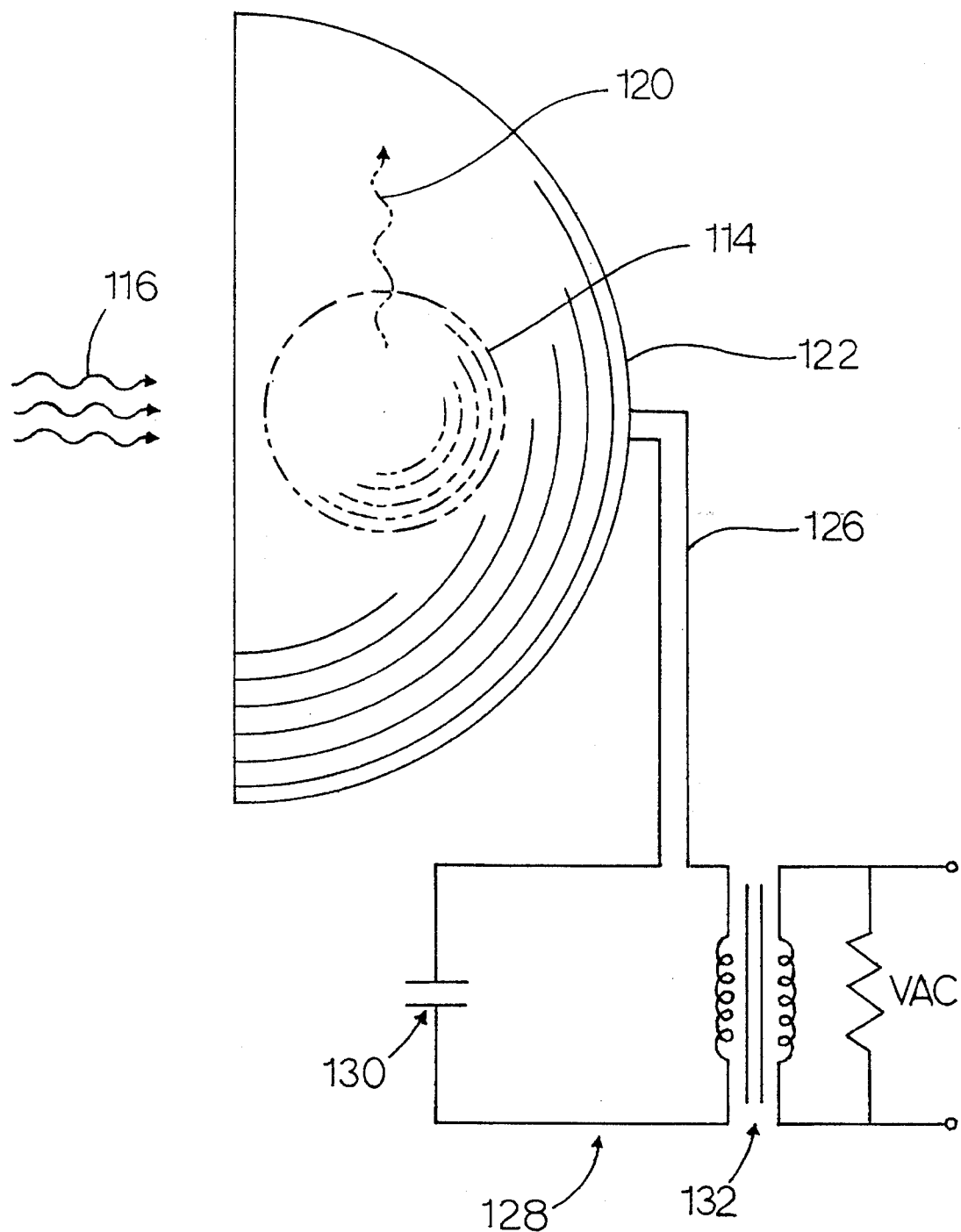
FIG. 3 is a perspective view of the receiving structures, antenna and waveguide of the second embodiment shown in FIG. 2 with a schematic view of the converter thereof and also showing the incident primary and emitted secondary electromagnetic radiation.

FIGS. 2 and 3 show a second embodiment of the present invention generally designated by the numeral 110. Embodiment 110 is essentially the same as embodiment 10 except that the antenna is a rf cavity structure 122 which feeds the received beat frequency radiation 124 to a waveguide 126. Embodiment 110 also preferably includes two spheres 112 and 114 which receive the primary incident electromagnetic radiation 116 and emit the secondary electromagnetic radiation 118 and 120. As with the spheres 18 and 20 of embodiment 10, spheres 118 and 120 are preferably composed of a dielectric material. Embodiment 110 also includes converter 128, capacitor 130, transformer 132 and rectifier 134 which are essentially identical to the correspondingly numbered elements of embodiment 10. Therefore, a description of these components of embodiment 110 will not be repeated in order to promote brevity. In addition, the same equations and method of calculation set forth above with regard to embodiment 10 also apply to embodiment. Therefore, their description will not be repeated in order to promote brevity.

Figure 4:
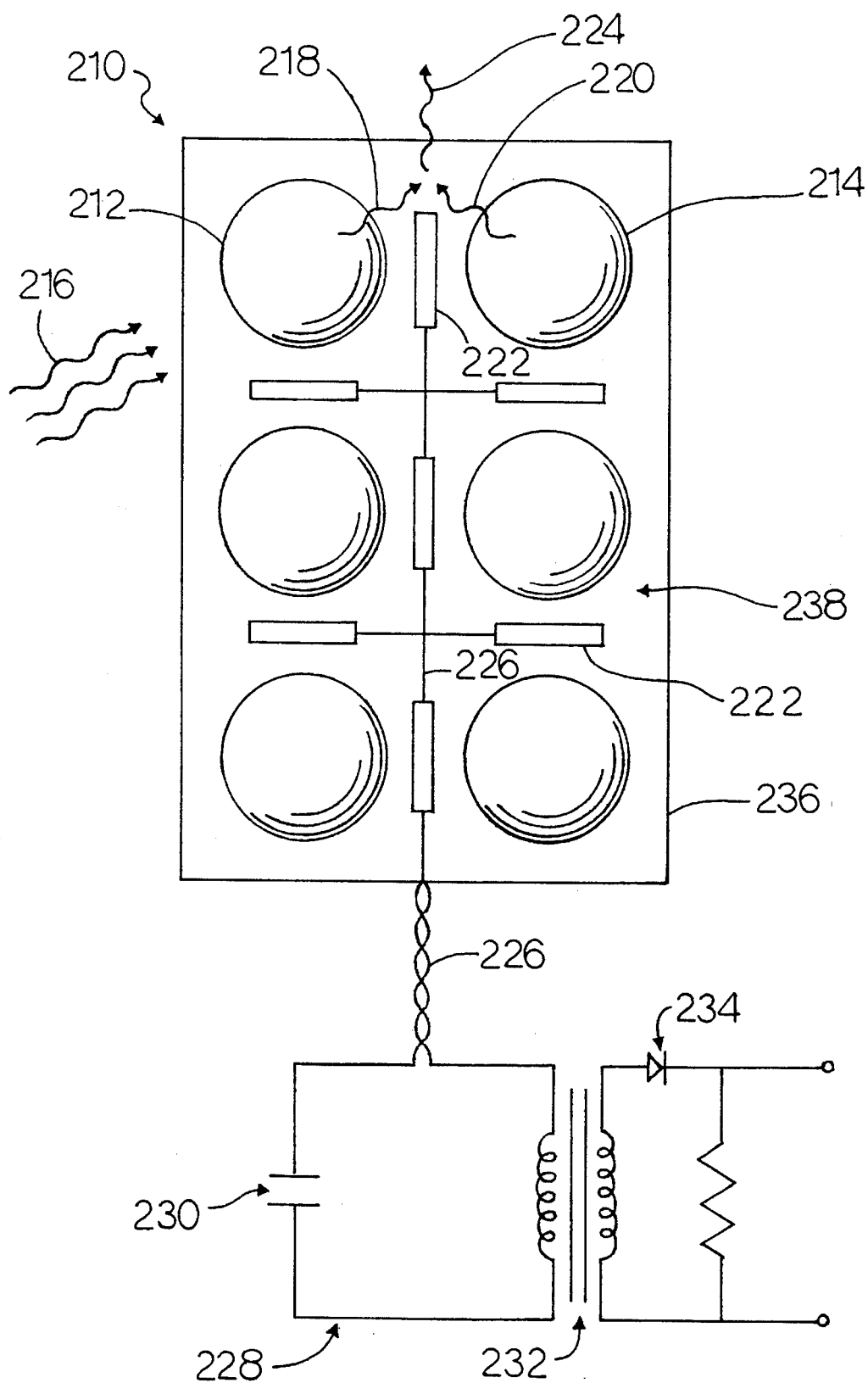
FIG. 4 is a front view of the substrate and a plurality of pairs of the receiving structures and a plurality of antennas of a third embodiment of the system of the present invention with a schematic view of the conductor and converter thereof and also showing the incident primary and emitted secondary electromagnetic radiation.
Figure 5:
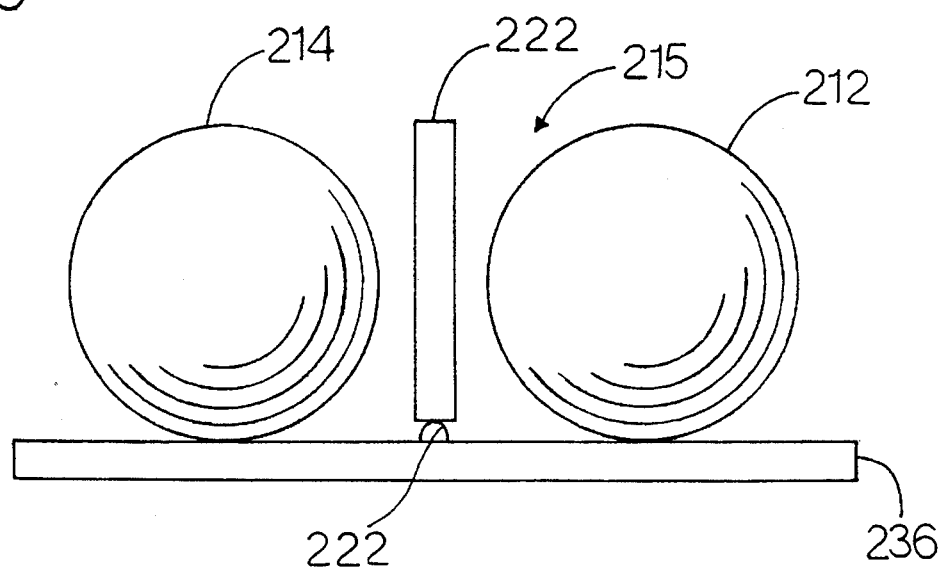
FIG. 5 is a top view of some of the components of the third embodiment of the system of the present invention showing two of the plurality of pairs of receiving structures and two of the plurality of antennas mounted on the substrate.

FIGS. 4 and 5 show a third embodiment of the present invention generally designated by numeral 210. Embodiment 210 is essentially identical to the first embodiment 10 except that the embodiment 210 includes a plurality of pairs 215 of receiving means (spheres) 212 and 214 mounted on a substrate 236. The spheres 212 and 214 are thus in the form of an array 238. The pairs 215 of the array 238 are preferably positioned proximal to each other in order to maximize the amount of energy extracted from a particular area or space of a given size. Since, as set forth hereinabove, the energy density of the zero point radiation increases as the frequency of the radiation increases, it is desirable that the spheres resonate at as high a bandwidth of frequencies as possible. Because the spheres 212 and 214 must be small in direct proportion to the wavelength of the high frequencies of the incident electromagnetic radiation 216 at which resonance is desirably obtained, the spheres 212 and 214 are preferably microscopic in size. Current lithographic techniques are capable of manufacturing such microscopically small spheres mounted on a suitable substrate thereby providing a suitably miniaturized system 210. A miniaturized system enhances the energy output capability of the system by enabling it to resonate at higher frequencies at which there are correspondingly higher energy densities. Consequently, utilization of array 238 in the system 210 enhances the maximum amount of electrical energy provided by the system 210.

Lithographic techniques may be more amenable to manufacturing microscopically small receiving structures 212 and 214 which may be disc shaped, semispherical or have another shape other than as shown in FIGS. 4 and 5. Consequently, the receiving means 212 and 214 may accordingly have such alternative shapes rather than the spherical shape shown in FIGS. 4 and 5. In addition, a large number of small spheres may be manufactured by bulk chemical reactions. Packing a volume with such spheres in close proximity could enhance the output of energy.

Embodiment 210 also includes a plurality of antennas 222 positioned preferably between the spheres 212 and 214 which receive the beat frequency radiation 224 produced by the interference between the secondary radiation 218 and 220. The antennas 222 are shown as loop antennas 222 but may be any other suitable type of antennas as well.

Embodiment 210 has a plurality of electrical conductors 226 which preferably include traces mounted on the substrate 236 which occupies a finite volume. The electrical conductors 226 feed the electrical output from the antennas 222 to a suitable converter 228 which preferably includes tuning capacitor 230, transformer 232 and rectifier 234, as with embodiments 10 and 110. Except as set forth above, the components of embodiment 210 are identical to embodiment 10 so the detailed description of these components will not be repeated in order to promote brevity. In addition, the same equations and method of calculation set forth above for embodiment 10 also apply to embodiment 210. Therefore, the description of these equations and method of calculation will not be repeated in order to promote brevity.

Accordingly, there has been provided, in accordance with the invention, a system which converts high frequency zero point electromagnetic radiation into electrical energy effectively and efficiently and thus fully satisfies the objectives set forth above. It is to be understood that all terms used herein are descriptive rather than limiting. Although the invention has been specifically described with regard to the specific embodiments set forth herein, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

What is claimed is:

1. A system for converting incident electromagnetic radiation energy to electrical energy, comprising:
    a first means for receiving incident primary electromagnetic radiation, said means for receiving producing emitted secondary electromagnetic radiation at a first frequency, said first means for receiving having a first volumetric size selected to resonate at a frequency within the frequency spectrum of the incident primary electromagnetic radiation in order to produce the secondary electromagnetic radiation at the first frequency at an enhanced energy density;

a second means for receiving the incident primary electromagnetic radiation, said means for receiving producing emitted secondary electromagnetic radiation at a second frequency, the secondary radiation at the first frequency and the secondary radiation at the second frequency interfering to produce secondary radiation at a lower frequency than that of the incident primary radiation, said second means for receiving having a second volumetric size selected to resonate at a frequency within the frequency spectrum of the incident primary electromagnetic radiation in order to produce the emitted secondary electromagnetic radiation at the second frequency at an enhanced energy density;

an antenna for receiving the emitted secondary electromagnetic radiation at the lower frequency, said antenna providing an electrical output responsive to the secondary electromagnetic radiation received;

a converter electrically connected to said antenna for receiving electrical current output from said antenna and converting the electrical current output to electrical current having a desired voltage and waveform.

2. The system of claim 1 wherein:

said first means for receiving is composed of a dielectric material; and said second means for receiving is composed of a dielectric material.

3. The system of claim 1 wherein:

said first means for receiving is spherical; and said second means for receiving is spherical.

4. A system for for converting incident zero point electromagnetic radiation energy to electrical energy, comprising:

a first means for receiving incident primary zero point electromagnetic radiation, said means for receiving producing emitted secondary electromagnetic radiation at a first frequency;

a second means for receiving the incident primary zero point electromagnetic radiation, said means for receiving producing emitted secondary electromagnetic radiation at a second frequency, the secondary radiation at the first frequency and the secondary radiation at the second frequency interfering to produce secondary radiation at a beat frequency which is lower than that of the incident primary radiation;

an antenna for receiving the emitted secondary electromagnetic radiation at the lower frequency, said antenna providing an electrical output responsive to the secondary electromagnetic radiation received;

means for transmitting the emitted secondary electromagnetic radiation at the beat frequency from said antenna, said means for transmitting connected to said antenna;

a converter connected to said means for transmitting for receiving the emitted secondary electromagnetic radiation at the beat frequency from said antenna and converting the same to electrical current having a desired voltage and waveform.

5. The system of claim 4 wherein:

said first means for receiving has a first volumetric spherical size selected to resonate in response to the incident primary electromagnetic radiation in order to produce the secondary electromagnetic radiation at the first frequency at an enhanced energy density; and said second means for receiving has a second volumetric spherical size selected to resonate in response to the incident primary electromagnetic radiation in order to produce the emitted secondary electromagnetic radiation at the second frequency at an enhanced energy density, said first and second volumetric sizes selected based on parameters of propagation constant of said first and second means for receiving, propagation constant of medium in which said first and second means for receiving are located and frequency of the incident primary electromagnetic radiation.

6. The system of claim 5 wherein the first and second volumetric sizes are selected by utilizing the formulas:

$$a_n^t = \frac{\mu_1 j_n(\rho)[\rho h_n^{(1)}(\rho)]' - \mu_1 h_n^{(1)}(\rho)[\rho j_n(\rho)]'}{\mu_1 j_n(N\rho)[\rho h_n^{(1)}(\rho)]' - \mu_2 h_n^{(1)}(\rho)[N\rho j_n(N\rho)]'}$$

$$b_n^t = \frac{\mu_1 N j_n(\rho)[\rho h_n^{(1)}(\rho)]' - \mu_1 N h_n^{(1)}(\rho)[\rho j_n(\rho)]'}{\mu_2 N^2 j_n(N\rho)[\rho h_n^{(1)}(\rho)]' - \mu_1 h_n^{(1)}(\rho)[N\rho j_n(N\rho)]'}$$

$$\rho = a\omega \sqrt{\epsilon_2 \mu_2}$$

wherein at a resonance, the denominator of either equation for $a_n^t$ or $b_n^t$ will be approximately zero and wherein $k_1$=propagation constant of the means for receiving, $k_2$=propagation constant of medium through which the incident electromagnetic radiation propagates, a is the radius of either means for receiving, $N=k_1/k_2$, $\rho=k_2 a$, $k_1 a=N\rho$, $a_n^t$=magnitude of oscillations of the electric field of the nth order, $b_n^t$=magnitude of oscillations of the magnetic field of the nth order, $\omega$=angular frequency of the incident electromagnetic radiation, $\epsilon$ is the permittivity of the material or medium and $\mu$ is the permeability of the material or medium.

7. The system of claim 6 wherein the radius of the first means for receiving is different from the radius of the second means for receiving, difference between the radius of said first means for receiving and the radius of said second means for receiving selected so that the beat frequency resulting from the difference is a frequency which facilitates conversion of the beat frequency electromagnetic radiation to electrical energy.

8. The system of claim 4 wherein:

said first means for receiving is composed of a dielectric material; and said second means for receiving is composed of a dielectric material.

9. The system of claim 4 wherein:

said first means for receiving is spherical; and said second means for receiving is spherical.

10. The system of claim 4 wherein said antenna is positioned generally between said first and second means for receiving.

11. The system of claim 4 wherein said antenna is a loop antenna.

12. The system of claim 4 wherein said antenna is a generally concave shell partially enclosing said first and second means for receiving.

13. The system of claim 4 wherein said means for transmitting is a waveguide.

14. A system for for converting incident zero point electromagnetic radiation energy to electrical energy, comprising:

a substrate;

a plurality of pairs of first means for receiving incident primary zero point electromagnetic radiation and second means for receiving incident primary zero point electromagnetic radiation, said plurality of pairs of means for receiving mounted on said substrate, said first means for receiving producing emitted secondary electromagnetic radiation at a first frequency, said second means for receiving the incident primary zero point electromagnetic radiation producing emitted secondary electromagnetic radiation at a second frequency, the secondary radiation at the first frequency and the secondary radiation at the second frequency interfering to produce secondary radiation at a beat frequency which is lower than that of the incident primary radiation, said first means for receiving having a first volumetric size selected to resonate in response to the incident primary electromagnetic radiation in order to produce the secondary electromagnetic radiation at the first frequency at an enhanced energy density, and said second means for receiving having a second volumetric size selected to resonate in response to the incident primary electromagnetic radiation in order to produce the emitted secondary electromagnetic radiation at the second frequency at an enhanced energy density, said first and second volumetric sizes selected based on parameters of propagation constant of said first and second means for receiving, propagation constant of medium in which said first and second means for receiving are located and frequency of the incident primary electromagnetic radiation, said first and second volumetric sizes being different from each other;

a plurality of antennas for receiving the emitted secondary electromagnetic radiation at the lower frequency, said antenna providing an output responsive to the secondary electromagnetic radiation received, said plurality of antennas mounted on said substrate, each of said plurality of antennas receiving the emitted secondary electromagnetic radiation of one of said pairs of first and second means for receiving;

means for transmitting the emitted secondary electromagnetic radiation at the beat frequency from said antenna, said means for transmitting connected to said plurality of antennas;

a converter connected to said means for transmitting for receiving the emitted secondary electromagnetic radiation at the beat frequency from said antenna and converting the same to electrical current having a desired voltage and waveform.

\* \* \* \* \*